United States Patent
Steinmetz et al.

(10) Patent No.: US 9,542,844 B2
(45) Date of Patent: Jan. 10, 2017

(54) PROVIDING NAVIGATION DIRECTIONS IN VIEW OF DEVICE ORIENTATION RELATIVE TO USER

(71) Applicant: GOOGLE INC., Mountain View, CA (US)

(72) Inventors: William Henry Steinmetz, Seattle, WA (US); Riku Inoue, Mountain View, CA (US); Kyle Jutte, San Fancisco, CA (US)

(73) Assignee: GOOGLE INC., Mountain View, CA (US)

( * ) Notice: Subject to any disclaimer, the term of this patent is extended or adjusted under 35 U.S.C. 154(b) by 24 days.

(21) Appl. No.: 14/178,079

(22) Filed: Feb. 11, 2014

(65) Prior Publication Data

US 2015/0228191 A1    Aug. 13, 2015

(51) Int. Cl.
G08G 1/123 (2006.01)
G08G 1/0968 (2006.01)
G01C 21/36 (2006.01)

(52) U.S. Cl.
CPC .......... *G08G 1/0968* (2013.01); *G01C 21/367* (2013.01); *G01C 21/3655* (2013.01)

(58) Field of Classification Search
CPC .................................................. G08G 1/0968
USPC ..... 340/980, 995.1, 995.27; 701/455; 345/7, 345/8
See application file for complete search history.

(56) References Cited

U.S. PATENT DOCUMENTS

| | | | |
|---|---|---|---|
| 6,360,187 B1 * | 3/2002 | Hermann | G01C 21/3629 340/460 |
| 8,412,413 B1 * | 4/2013 | Stark et al. | 701/36 |
| 9,092,051 B2 * | 7/2015 | Park | G06F 3/01 |
| 2009/0153472 A1 * | 6/2009 | Bloem et al. | 345/156 |
| 2009/0195497 A1 | 8/2009 | Fitzgerald et al. | |
| 2009/0303204 A1 * | 12/2009 | Nasiri et al. | 345/184 |
| 2010/0079508 A1 | 4/2010 | Hodge et al. | |
| 2010/0125816 A1 * | 5/2010 | Bezos | 715/863 |
| 2010/0127971 A1 * | 5/2010 | Ellenby | 345/156 |
| 2011/0054775 A1 | 3/2011 | Snyder | |
| 2012/0300061 A1 * | 11/2012 | Osman | G06F 1/3231 348/135 |
| 2013/0016103 A1 | 1/2013 | Gossweiler, III et al. | |
| 2014/0063058 A1 * | 3/2014 | Fialho et al. | 345/633 |
| 2014/0160012 A1 * | 6/2014 | Su et al. | 345/156 |
| 2014/0195143 A1 * | 7/2014 | Kandangath | G01C 21/3629 701/400 |
| 2015/0010207 A1 * | 1/2015 | Inada et al. | 382/103 |

OTHER PUBLICATIONS

International Search Report and Written Opinion for Application No. PCT/US2015/014362, dated Apr. 23, 2015.

* cited by examiner

*Primary Examiner* — Brian Zimmerman
*Assistant Examiner* — Thomas McCormack
(74) *Attorney, Agent, or Firm* — Marshall, Gerstein & Borun LLP (57) ABSTRACT

To provide effective navigation directions to a user in an automotive environment, a system determines information related to navigating the user to a destination, determines whether a screen of the portable device currently is in a line-of-sight with the user and generates a navigation instruction based on the determined information. Generating the navigation instruction includes selecting a level of detail of visual information for the navigation instruction in view of whether the screen is in the line-of-sight with the user.

20 Claims, 3 Drawing Sheets

PROVIDING NAVIGATION DIRECTIONS IN VIEW OF DEVICE ORIENTATION RELATIVE TO USER

FIELD OF TECHNOLOGY

This application generally relates to navigation in a portable user device, more particularly, to generating navigation instructions at varying levels of detail of auditory and visual information.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many navigation systems operating in portable devices such as smartphones or in head units of vehicles provide navigation directions to users. Some of these systems can generate visual information audio announcements based on these directions. For example, a navigation system can generate a digital map image illustrating a route and an audio announcement explaining a maneuver. However, the user may not always find every presentation of auditory or visual information useful. For example, when a navigation software provides a visual overview of a navigation route via a display of a portable user device, this overview is not very useful is the portable device is in the user's pocket.

SUMMARY

A mapping and navigation software module operating in a portable user device determines the current operational context of the portable device and selects the suitable level of detail for visual and/or auditory instructions in view of the determined contact. For example, the software module can assess and weigh one or more of the following example factors: (i) whether the display of the portable device is likely in the line-of-sight of the driver, (ii) whether the display turned off upon a timeout event or the user deliberately turned off the display via an explicit command, (iii) whether the current level of ambient noise makes it likely that an audio announcement will be heard, (iv) whether the user's past activity and/or explicit settings indicate that he or she prefers a certain form of presentation of navigation directions, and (v) whether the request for navigation directions or the next step in the navigation directions was submitted via a keyboard or a voice command. Depending on these factors, the software module selects levels of detail of visual and auditory navigation instructions. Thus, the software module in some cases can provide an instruction visually without the auditory counterpart, and in other cases the software module can provide only an auditory instruction without activating the screen at all.

More particularly, an example embodiment of these techniques is a method in a portable device for providing effective navigation directions to a user in an automotive environment. The method includes determining, by one or more processors, information related to navigating the user to a destination. The method further includes determining, by the one or more processors, whether a screen of the portable device currently is in a line-of-sight with the user. Still further, the method includes generating, by the one or more processors, a navigation instruction based on the determined information, including selecting a level of detail of visual information for the navigation instruction in view of whether the screen is in the line-of-sight with the user.

Another embodiment of these techniques is a portable device that includes one or more sensors configured to generate a signal indicative of a current orientation of the portable device, a visual interface, an audio interface, and a navigation component coupled to the one or more sensors, the visual interface, and the audio interface. The navigation component is configured to generate a navigation instruction for navigating a user of the portable device to a certain destination, determine whether the visual interface is likely in view of the user based on the current orientation of the portable device to generate a line-of-sight indication, and select a first level of detail of visual information and a second level of detail of auditory information for the navigation instruction, to be provided respectively via the visual interface and the audio interface, based on the line-of-sight indication.

Yet another embodiment of these techniques is a non-transitory computer-readable medium storing thereon instructions that implement a navigation module. When executed on one or more processors, the navigation module is configured to generate a navigation instruction for navigating a user of a portable device to a certain destination, automatically determine whether a visual interface of the portable device is likely in a line-of-sight with the user, select a level of detail of visual information related to the navigation instruction based at least in part whether the visual interface is likely in the line-of-sight with the user, and, when the selected level of detail is greater than zero, cause the visual information to be provided via the visual interface of the portable device.

DETAILED DESCRIPTION

Figure 1:
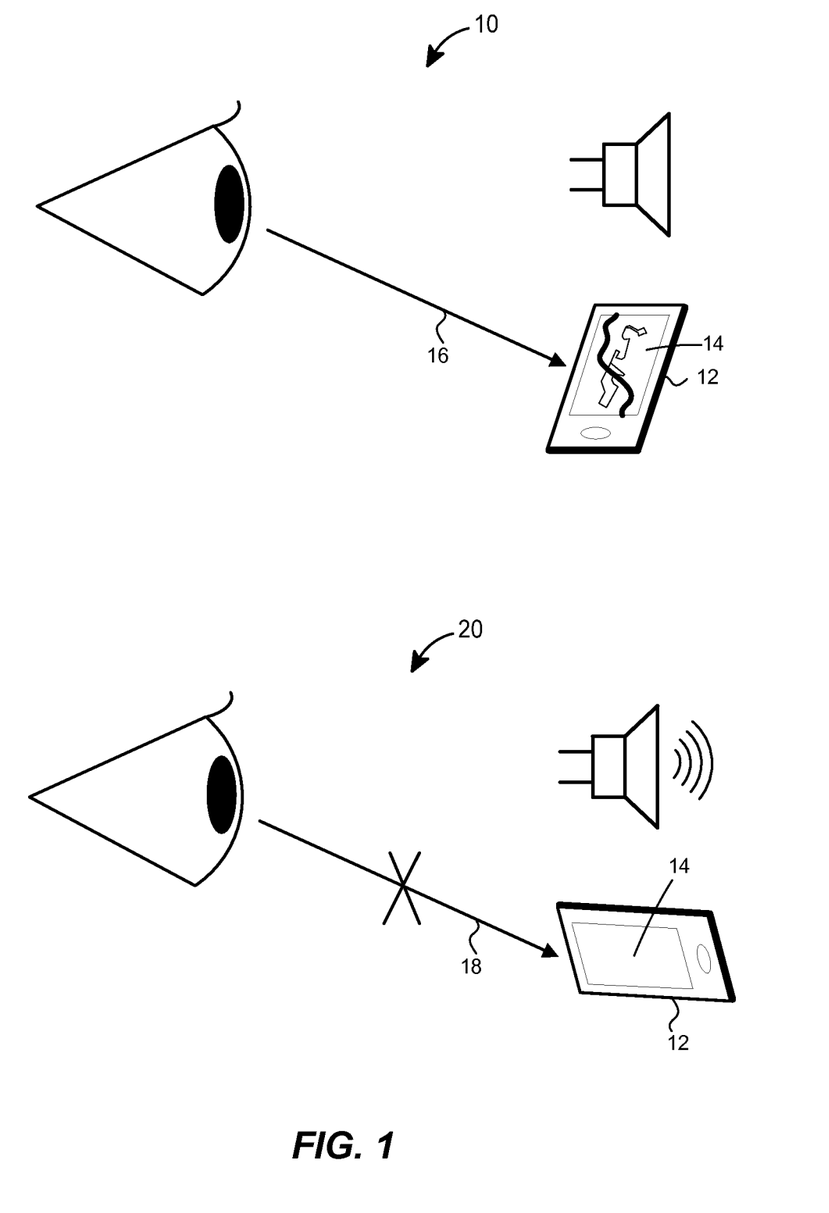
FIG. 1 schematically illustrates an example scheme for generating navigation instructions on a portable device in view of the current orientation of the portable device relative to a user.

To briefly illustrate some of the techniques of this disclosure, FIG. 1 depicts two example scenarios in which a portable device selects the level of detail for visual and auditory instructions in view of the orientation of the device relative to the user. In a scenario 10, a smartphone 12 is oriented so that its screen 14 is in a user's line-of-sight 16. The smartphone 12 estimates its orientation relative to the user using one or more sensors and, upon determining that the screen 14 is in the line-of-sight 16, generates a visual representation of an instruction describing a step in navigation directions, and does not generate a corresponding auditory representation of the instruction.

On the other hand, the smartphone 12 in a scenario 20 estimates its orientation relative to the user and determines that the screen 14 is not in a line-of-sight 18 of the user. In response, the smartphone 12 generates an auditory representation of an instruction describing a step in navigation directions, and does not generate a corresponding visual representation of the instruction. In other words, the smartphone 12 in the scenarios 10 and 20 selects between auditory and visual representations of navigation directions depending on whether the user is likely to be able to see the screen 14.

More generally, according to the techniques of this disclosure, a mapping and navigation software selects the level of detail for auditory and visual representations of navigation directions to be provided via a portable device in view of the current operational context of the portable device. As discussed in more detail below, the current context can include the orientation of the portable device, the mode of operation of the screen (e.g., active mode, screensaver mode), the level of ambient noise, connection to an external device such as the head unit of a vehicle, etc.

Figure 2:
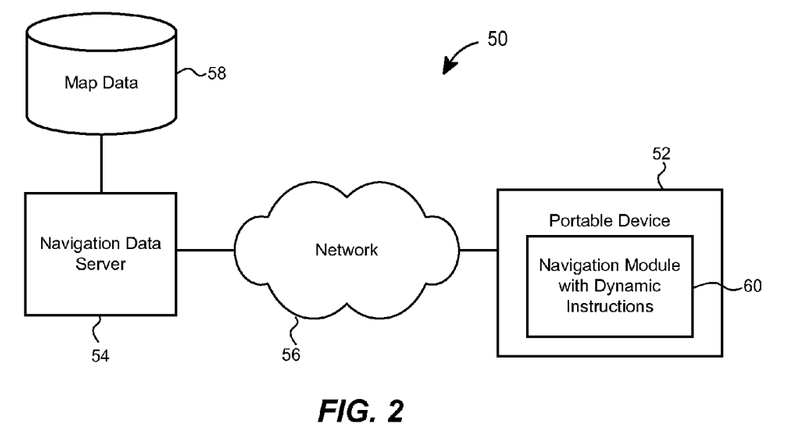
FIG. 2 is a block diagram of an example system in which the level of visual and/or auditory detail for a navigation instruction is selected in view of the current state of a portable user device.

FIG. 2 depicts an example system 50 in which the level of visual and/or auditory detail for a navigation instruction is selected in view of the current state of a portable user device 52. Depending on the implementation, the portable device 52 can be, for example, a smartphone similar to the smartphone 12 of FIG. 1 or a tablet computer. The portable device 52 is coupled to a navigation data server 54 via a communication network 56, which can be any suitable local or wide area network including the Internet. The navigation data server 54 is coupled to a map database 58. In operation, the navigation data server 54 can receive a request for navigation directions for navigating to a specified destination and generate, using street and road data stored in the map database 58, step-by-step navigation directions. The portable device 52 implements a navigation module with dynamic instructions 60 that receives the step-by-step navigation directions from the navigation data server 54, determines the current operational context of the portable device 52, and selects the level of detail for visual and/or auditory presentation of an instruction included in the step-by-step navigation directions based on the current operational context. The portable device 52 then generates visual information related to the instruction by rendering a digital map, displaying a route as an overlay, displaying text, etc. and/or auditory information related to the instruction by generating a voice announcement using suitable text-to-speech (TSS) technology, in accordance with the determined levels of detail.

In other implementations, the portable device 52 can store navigation and/or map data in a local memory or on peripheral storage device such as an optical disk. In yet other implementations, the module 60 can be implemented in the navigation data server 54 or distributed between the navigation data server 54 and the portable device 52. Further, generation of map images and voice announcements generally can be implemented on the portable device 52, on the navigation data server 54, partially on both, or on another server.

Figure 3:
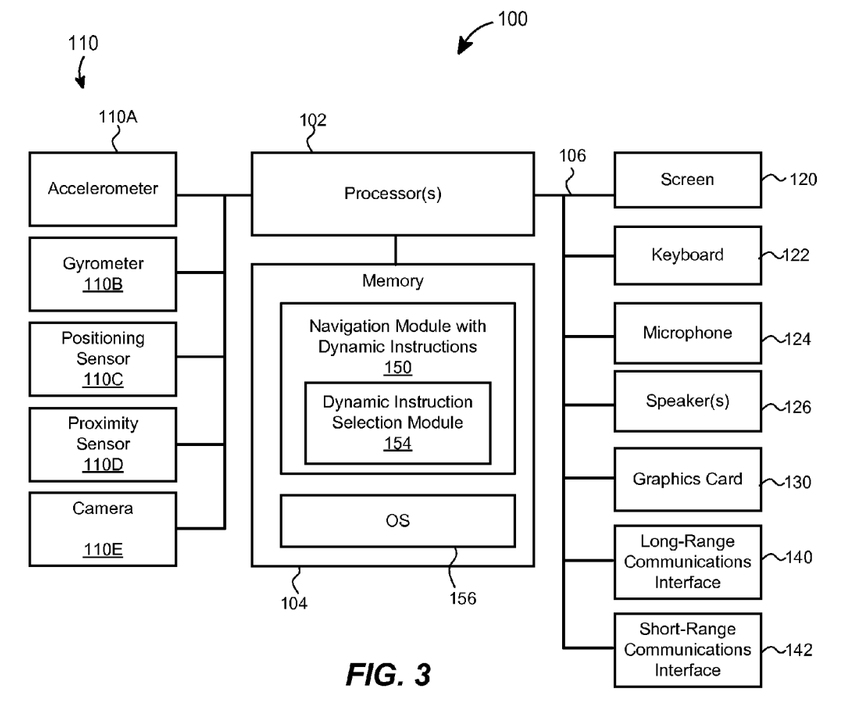
FIG. 3 is a block diagram of an example portable user device that can operate in the system of FIG. 2.

An example portable user device that can operate as the portable device 52 is illustrated in FIG. 3, and an example method for selecting the level of visual and/or auditory detail for a navigation instruction, which can be implemented in the portable device of FIG. 3, is then discussed with reference to FIG. 4.

Referring first to FIG. 3, an example portable device 100 includes one or more processors 102 coupled to a memory 104. Each of the one or more processors 102 can be any suitable general-purpose processing unit (e.g., a CPU), a microprocessor, or an application-specific processing unit. The memory 104 can a non-transitory computer-readable medium that can include persistent components such as a hard disk, a flash drive, etc. and non-persistent components such as a random access memory (RAM) unit. The processor(s) 102 and the memory 104 can be interconnected via a suitable electrical connection such as a digital bus 106, for example.

The portable device 100 further includes a set sensors 110 that includes, in this example configuration, an accelerometer 110A and a gyrometer 110B to generate signals indicative of the orientation of the portable device 100 in three-dimensional space, a positioning sensor 110C such as a global positioning service (GPS) module, a proximity sensor 110D, and one or more cameras 110E. The memory 104 can store the corresponding drivers to process the signals from the sensors 110 and determine various characteristics of the portable device 100. In other implementations, the set sensors 110 can include additional sensors such as a digital compass to better or more quickly estimate the current orientation of the portable device 100, a barometer to more quickly estimate the current altitude of the portable device 100, a light sensor to measure the amount of ambient light, etc. Conversely, the portable device 100 in some implementations does not include all of the sensors 110 illustrated in FIG. 3.

The portable device 100 also can include devices configured to receive user input and provide output to a user. The portable device 100 can include a visual interface such as a screen 120, a screen external to the portable device 100, or any other component or a set of components for generating a visual presentation of data. In some implementations, the screen 120 is a touchscreen configured to both provide output and receive input. The audio interface of the portable device 100 can include one or more speaker(s) 126 or other suitable devices internal or external to the portable device 100. Further, input devices of the portable device 100 can include a keyboard 122 and a microphone 124. More generally, the portable device 100 can include any suitable input and output devices in addition to, or instead of, the modules 120-126 illustrated in FIG. 1.

In an example implementation, the portable device 100 further includes a graphics card 130 to efficiently render graphics content such as interactive digital maps, for example. Further, the portable device 100 includes a long-range communication interface 140 that can support wired and/or wireless communications and a short-range communication interface 14 that also can support wired and/or wireless communications. For example, the short-range communication interface 14 can be a Universal Serial Bus (USB) link.

The memory 104 stores a navigation module with dynamic instructions 150 as a set of instructions executable on the one or more processors(s) 102, for example. In various embodiments, the module 150 is implemented as an independent application, an extension of another application such as a web browser, as a script interpreted by a web browser or another application, etc. The module 150 includes a dynamic instruction selection module 154. The memory 104 also can store various parameters of the module 150 as well as data used by other software components.

With continued reference to FIG. 3, the memory 104 can store instructions that implement an operating system (OS) 156 as well as instructions that implement various applications, services, drivers, etc. (not shown). The OS 156 can provide application programming interfaces (API) to access various functions of the portable device 100. As one example, the OS 156 can process input from the sensors 110, determines various characteristics and parameters of the portable device 100 (such as the current location, orientation, speed of travel), and provide access to these characteristics via a set of APIs to software applications including the navigation module with dynamic instructions 150. The module 150 can be generally similar to the module 60 of FIG. 2.

In operation, the navigation module with dynamic instructions 150 can receive a request for navigation directions from a user via the keyboard 122, the microphone 124, or the screen 120 (if implemented as a touchscreen). The module 150 can obtain navigation directions from a network server (such as the navigation data server 54) and provide these directions to the user via the output devices such as the screen 120 and the speaker(s) 126. When the portable device 100 is being used in a vehicle, the module 150 can provide some or all of the output to the head unit of the vehicle via the short-range communication interface 142.

The module 150 can provide all the navigation directions at once (e.g., as a route overview) or on a per-maneuver basis, as the user approaches the corresponding location. The dynamic instruction selection module 154 determines the current operational context of the portable device 100 using such parameters as, for example, data from one or more of the sensors 100, the user's personal settings (which may be stored in the memory 104 and/or a network server), the current state of the screen 120, the history of user commands provided to the module 150 (e.g., "turn off display"), etc. The module 154 then determines the level of detail of visual information for a certain navigation instruction based on the determined current context. The level of detail can be zero (when the module 154 determines that no visual information should be provided), low (when the module 154 determines that some but not all the available visual information is likely to be useful), or high (when the module 154 determines that all of the available visual information is likely to be useful). Depending on the implementation, the module 154 can generate any suitable number of levels of detail.

To determine the level of detail for visual, auditory, and other types of information based on multiple factors, the module 154 can assign respective weights to the signals. Thus, the current orientation of the screen 120 can correspond to a first weight (which may be relatively high, for example), the indication of whether the user turned off the screen 120 can correspond to a second weight (which may be lower than the first weight), the user's probable, estimated preference can correspond to a third weight (which may be even lower), etc. The module 154 can use the weighed parameters to generate a single numerical score.

In an example scenario, the user of the portable device 100 wishes to know whether alternate routes to the previously selected route are available. The user submits the query via a voice command. In response, the module 150 determines an alternate route which includes multiple steps. The module 150 can provide a visual overview of the entire alternate route, but such an overview is useless if the user is not currently looking at the screen. On the other hand, an audio overview of this route may be long and verbose. The dynamic instruction selection module 154 in an example implementation determines whether to generate an overview of the alternative route that is visual, auditory, or both.

To determine the appropriate levels of detail, the module 154 in an example scenario estimates the current direction of travel of the portable device 100 using the positioning sensor 110C. The module 154 also determines the current orientation of the portable device 100 using the accelerometer 110A and the gyrometer 110B. If the module 154 indicates that the portable device 100 is traveling parallel to the ground (in other words, the user is currently driving, bicycling, or walking) but facing down, the module 154 may determine that the screen 120 is likely not in the line-of-sight with the user. In other scenarios, the module 154 can determine that the portable device 100 is likely in the cupholder based on a signal from the proximity sensor 110D or a signal from the camera 110E. In some implementations, the OS 156 can provide a set of functions to determine the likely orientation of the screen 120 relative to the user.

In an embodiment, the module 154 determines the level of detail for visual and auditory information based solely on the determination of whether the screen 120 is in the line-of-sight with the user. In other embodiments, however, the module 154 proceeds to determine whether the screen 120 is currently active. When the screen 120 is currently active, it is more likely that the user will see the information presented on the screen 120. If the screen 120 is currently inactive, the user is likely to ignore the visual information (even if the screen 120 is in his or her line-of-sight).

When the screen 120 is off, the module 154 can determine whether user turned off the screen 120 by locking the screen or otherwise issuing a command. A user command to lock the screen 120 generally indicates that the user is not interested in visual information at this time.

Further, the module 154 can determine whether the user activated certain settings to indicate his or her preference for visual and/or auditory information. If the user disabled a certain type of information, the module 154 will conform to the user's selection. However, if the user has not expressed any preferences, the module 154 can consider past navigation requests to ascertain whether the user likely prefers a certain type of output (in an embodiment, the user operates certain controls and/or installs a certain application to allow the module 154 to consider this type of data).

Still further, the module 154 can determine whether module 150 is providing visual and/or auditory to an external device, such as the head unit of a vehicle. If the module 150 is currently coupled to the head unit, the module 154 can determine, for example, that visual information should be generated regardless of the orientation of the portable device 100, as the user will see the visual information on the head unit.

It is noted that although the examples above primarily focus on visual and auditory information, the techniques of this disclosure also can be used with vibrational output and, more generally, any other type of output.

Figure 4:
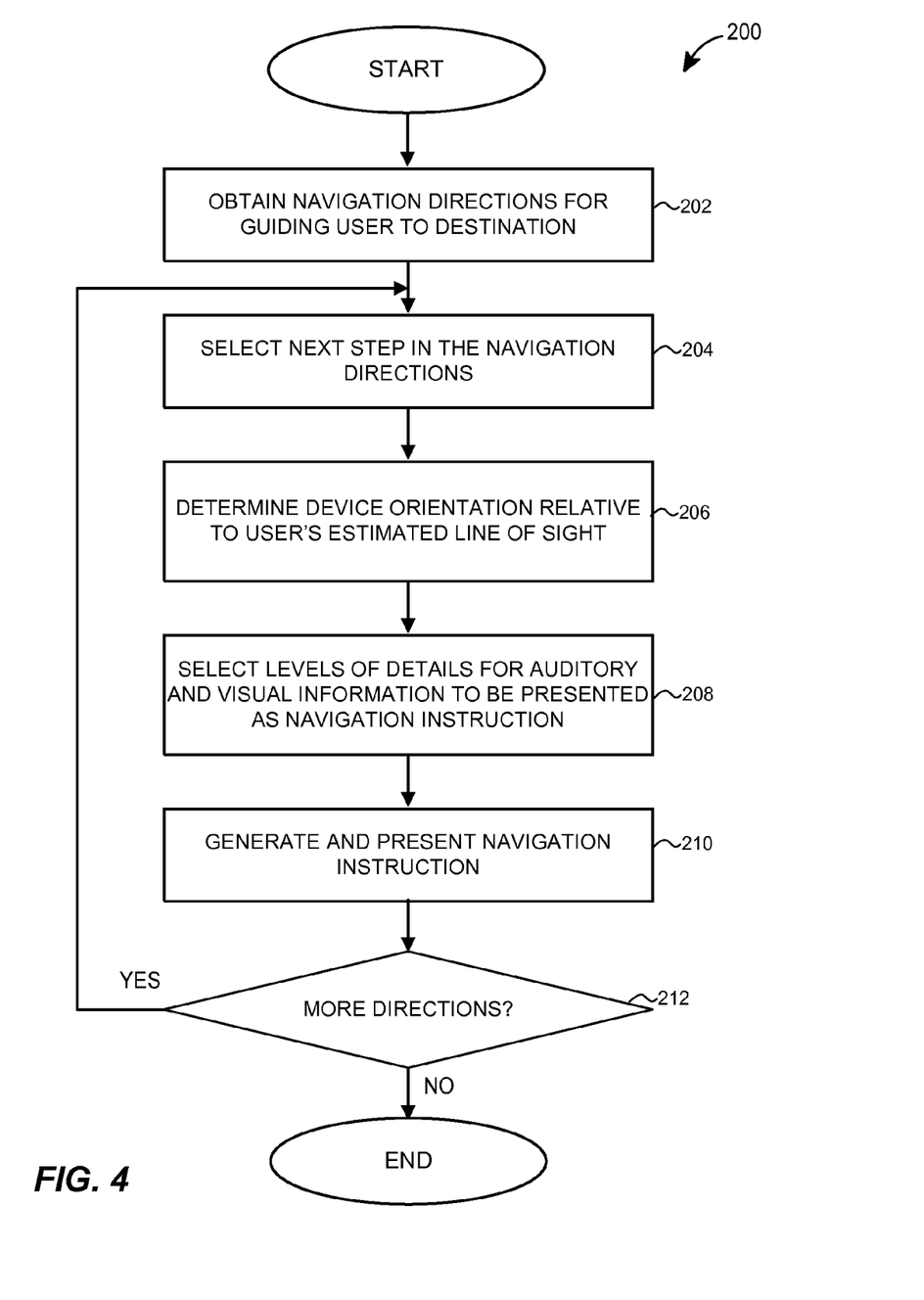
FIG. 4 is a flow diagram of an example method for selecting the level of visual and/or auditory detail for a navigation instruction, which can be implemented in the portable user device of FIG. 2 or a similar device.

Now referring to FIG. 4, a method 200 can be implemented in the module 154 discussed above or in a similar module. In some embodiments, the method 200 is at least partially implemented in a network server. The method 200 can be implemented as instructions stored on a storage device and executed by one or more processors, for example.

The method 200 begins at block 202, where navigation directions for guiding a user to a destination are obtained from a network server or a local navigation engine. In a typical scenario, the navigation directions specify multiple steps the user must take to arrive at the destination.

A description of one of these steps is selected at block 204 as the next navigation instruction (when, for example, the user approaches the geographic location at which he or she must make a maneuver to follow the directions). Device orientation relative to the user is determined at block 206. More particularly, the method 200 can determine whether the screen is in the line-of-sight with the user. In other embodiments, one or more additional signals can be processed and weighed at block 206, as discussed above.

At block 208, the respective levels of detail are selected for visual and auditory information related to the navigation instruction. For example, it can be determined only an auditory description of the navigation instruction should be provided, only a visual description of the navigation instruction should be provided, that a low-detail auditory description along with a highly detailed visual description should be provided, etc. The corresponding instructions then can be generated at block 210.

If additional directions or navigation instructions are available (block 212), the flow then returns to block 204. Otherwise, the method ends after block 212.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for dynamically selecting levels of detail for navigation directions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a portable device for providing effective navigation directions to a user in an automotive environment, the method comprising:
   determining, by one or more processors, information related to navigating the user to a destination;
   determining, by the one or more processors, whether a screen of the portable device currently is likely in a line-of-sight with the user; and
   generating, by the one or more processors, a navigation instruction based on the determined information, including selecting (i) a level of detail of visual information for the navigation instruction, and (ii) a level of detail of auditory information for the navigation instruction, in view of whether the screen is likely in the line-of-sight with the user, wherein
      selecting the level of detail of visual information includes selecting the level of detail of visual information from among at least three different levels, the three different levels including a first level that includes some but not all visual information available for the navigation instruction and a second level that includes all of the visual information available for the navigation instruction, and
      selecting the level of detail of auditory information includes (i) selecting a higher level of detail of auditory information when the screen is likely not in the line-of-sight of the user, and (ii) selecting a lower level of detail of auditory information when the screen is likely in the line-of-sight of the user.

2. The method of claim 1, wherein generating the navigation instruction includes selecting the level of detail of visual information further in view of whether the screen is currently turned on.

3. The method of claim 1, wherein generating the navigation instruction includes selecting the level of detail of visual information further in view of whether the user turned off the screen or the screen turned off in response to a timeout event.

4. The method of claim 1, further comprising:
   detecting a level of ambient noise;
   wherein selecting the level of detail of auditory information for the navigation instruction is further in view of a level of ambient noise.

5. The method of claim 4, wherein selecting the level of detail of auditory information is in view of the selected level of detail of visual information.

6. The method of claim 1, wherein determining whether the screen is likely in the line-of-sight with the user includes determining an orientation of the portable device relative to ground.

7. The method of claim 1, wherein determining whether the screen is likely in the line-of-sight with the user includes determining whether the portable device is located in a cupholder inside a vehicle using at least one of a camera or a proximity sensor.

8. The method of claim 1, wherein determining the information related to navigating the user to the destination includes identifying an upcoming maneuver along a navigation route to the destination, wherein the navigation instructions describes the maneuver.

9. The method of claim 1, wherein determining the information related to navigating the user to the destination includes identifying an alternate route to the destination.

10. A portable device comprising:
one or more sensors configured to generate a signal indicative of a current orientation of the portable device,
a visual interface;
an audio interface; and
a navigation component coupled to the one or more sensors, the visual interface, and the audio interface, the navigation component configured to:
determine whether the visual interface is likely in view of a user of the portable device based on the current orientation of the portable device to generate a line-of-sight indication, and
generate a navigation instruction for navigating the user to a certain destination, at least in part by selecting a level of detail of visual information and a level of detail of auditory information for the navigation instruction, to be provided respectively via the visual interface and the audio interface, based on the line-of-sight indication, wherein
selecting the level of detail of visual information includes selecting the level of detail of visual information from among at least three different levels, the three different levels including a first level that includes some but not all visual information available for the navigation instruction and a second level that includes all of the visual information available for the navigation instruction, and
selecting the level of detail of auditory information includes (i) selecting a higher level of detail of auditory information when the line-of-sight indication indicates the visual interface is likely not in the view of the user, and (ii) selecting a lower level of detail of auditory information when the line-of-sight indication indicates the visual interface is likely in the view of the user.

11. The portable device of claim 10, further comprising:
a microphone configured to generate a signal indicative of a level of ambient noise,
wherein the navigation component is configured to select the level of detail of the visual information and the level of detail of the auditory information further based on the level of ambient noise.

12. The portable device of claim 10, further comprising:
at least one of (i) a proximity sensor and (ii) a camera,
wherein the navigation component is configured to generate the line-of-sight indication using the at least one of the proximity sensor and the camera.

13. The portable device of claim 10, further comprising:
one or more processors; and
a non-transitory computer-readable medium;
wherein the navigation component includes a plurality of instructions stored on the non-transitory computer-readable medium and executable on the one or more processors.

14. The portable device of claim 13, wherein the non-transitory computer-readable medium stores an indication of whether the user turned off the visual interface, wherein the navigation component is configured to select the level of detail of the visual information and the level of detail of the auditory information further based on whether the user turned off the visual interface.

15. A non-transitory computer-readable medium storing thereon instructions that implement a navigation module which, when executed on one or more processors, is configured to:
automatically determine whether a visual interface of a portable device is likely in a line-of-sight with a user of the portable device;
generate a navigation instruction for navigating the user to a certain destination, at least in part by selecting (i) a level of detail of visual information related to the navigation instruction, and (ii) a level of detail of auditory information related to the navigation instruction, based at least in part on whether the visual interface is likely in the line-of-sight with the user, wherein
selecting the level of detail of visual information includes selecting the level of detail of visual information from among at least three different levels, the three different levels including a first level that includes some but not all visual information available for the navigation instruction and a second level that includes all of the visual information available for the navigation instruction, and
selecting the level of detail of auditory information includes (i) selecting a higher level of detail of auditory information when the visual interface is likely not in the line-of-sight of the user, and (ii) selecting a lower level of detail of auditory information when the visual interface is likely in the line-of-sight of the user; and
when the selected level of detail of visual information is greater than zero, cause the visual information to be provided via the visual interface of the portable device.

16. The non-transitory computer-readable medium of claim 15, wherein the navigation module is further configured to:
determine whether the visual interface is currently active; and
select the level of detail of visual information related to the navigation instruction in view of whether the visual interface is currently active.

17. The non-transitory computer-readable medium of claim 16, wherein the navigation module is further configured to:
in response to determining that the visual interface is currently inactive, determine whether the visual interface was deactivated in response to a command from the user or upon automatically without the command from the user; and
select the level of detail of visual information related to the navigation instruction further in view of whether the visual interface was deactivated in response to the command from the user.

18. The non-transitory computer-readable medium of claim 15, wherein the navigation module is further configured to:
   cause the auditory information to be provided via an audio interface of the portable device.

19. The non-transitory computer-readable medium of claim 18, wherein the navigation module is further configured to:
   determine a level of ambient noise; and
   select the level of detail of auditory information related to the navigation instruction further in view of the current level of ambient noise.

20. The non-transitory computer-readable medium of claim 15, wherein to determine whether the screen of the portable device is likely in the line-of-sight with the user, the navigation module is configured to determine an orientation of the portable device in a three-dimensional space.

* * * * *